United States Patent
Schulenberg

[11] 3,798,733
[45] Mar. 26, 1974

[54] APPARATUS FOR APPLYING FINS TO PIPES WITH MEANS FOR PREVENTING BENDING OF THE FINS DURING APPLICATION

[75] Inventor: Heinrich Schulenberg, Bochum, Germany

[73] Assignee: Gea Luftkuehlergesellschaft Happel GmbH & Co. KG, Bochum, Germany

[22] Filed: Aug. 7, 1972

[21] Appl. No.: 278,617

[30] Foreign Application Priority Data
Aug. 27, 1971 Germany............................ 2142931

[52] U.S. Cl............................................. 29/202 R
[51] Int. Cl........................................... B23p 15/26
[58] Field of Search .......... 29/202 R, 202 D, 200 B, 29/208 R

[56] References Cited
UNITED STATES PATENTS
2,133,932  10/1938  Whistler et al..................... 29/202 R
2,247,730  7/1941  O'Brien.............................. 29/202 R Primary Examiner—Thomas H. Eager
Attorney, Agent, or Firm—Michael S. Striker

[57] ABSTRACT

Apparatus for applying fins from the free end of at least one pipe which is stationarily held at the other end thereof, in which the fins are pushed one by one onto the free end of the pipe and moved along the same by parallel entrainment members connected spaced from each other to a pair of endless substantially parallel sprocket chains, the working runs of which are moved in the direction of the pipe by driven sprocket wheels. The entrainment members are held in working position substantially normal to the pipe axis until they have pushed the respective fin to the desired position on the pipe, whereafter the respective entrainment member is permitted to tilt to a releasing position. To equalize any different elongation occurring in the two sprocket chains and to keep the entrainment members parallel to each other, equalizing sprocket wheels are provided which are connected to each other for synchronous rotation and which engage the working runs of the chains spaced from the driven sprocket wheels.

9 Claims, 3 Drawing Figures

APPARATUS FOR APPLYING FINS TO PIPES WITH MEANS FOR PREVENTING BENDING OF THE FINS DURING APPLICATION

BACKGROUND OF THE INVENTION

The present invention relates to an apparatus for applying fins to stationarily held pipes, in which the fins, slipped onto the free ends of the pipes, are pushed along the latter up to a desired respective end position by means of entrainment members which are connected spaced from each other to a pair of endless parallel sprocket chains extending parallel to each other and driven by synchronously rotating sprocket wheels. The entrainment members are tiltably connected to the sprocket chains and held in a working position extending substantially normal to the axis of the pipes until the respective entrainment member has transported a respective one of the fins to the desired end position, whereafter the entrainment member is permitted to tilt from the working to a releasing position. The sprocket chains may be provided with transport rollers with which the teeth of the sprocket wheels engage, to move the sprocket chains in the desired direction, however the drive of the sprocket chains may also be produced in another manner.

The working runs and return runs of the endless sprocket chains in such an apparatus have a relatively great length, for instance up to 20 meters since such an apparatus has to be used for applying fins to pipes of relatively great length, for instance 10 to 20 meters. Even if the side bars of the sprocket or pitch chains are relatively long, for instance 90 to 100 mm., each of the chains will have hundreds of links which will be subjected to relatively great and at the individual links to different wear. Experience has shown that during operation of such an apparatus for several months, the chains become elongated due to such wear and such an elongation of the chains due to wear may be in one of the chains considerably greater than in the other. If such a different length elongation occurs in the two chains, the entrainment members connected thereto will not any longer be maintained in a position substantially normal to the axes of the pipes, but be inclined at an angle to such a position, especially if the entrainment members have a relatively large width as is necessary if they are used for simultaneously applying fins to four or more pipes arranged parallel to each other and in which the sprocket chains to which the entrainment members are connected have to be arranged spaced from each other in transverse direction a correspondingly great distance. Such a relative large transverse inclination of the entrainment members will result in that the fins advanced thereby are only engaged by the entrainment members along one side edge of the latter and are likewise placed in an inclined position deviating from the position normal to the pipe axis so that the fins are bent or so that the normally provided fin collar which tightly engages the pipe will be widened. This in turn will result in that the fins, after they have been moved by the entrainment members to the desired end positions will not be tightly seated on the pipes, respectively be placed in the end positions not normal to the pipe axis but inclined thereto or be more or less bent. This will in turn result that the applied fins after being placed in the desired positions of the pipes may subsequently be displaced in an undesirable manner in longitudinal direction of the pipes, or that the inclined respective bent fins will, when the pipes with the fins thereon are used as heat exchange elements, produce in an air stream blown against such heat exchange elements an undesirably large flow resistance.

In apparatus of the aforementioned type known in the art it was therefore necessary to replace the worn sprocket chains after relatively short time.

SUMMARY OF THE INVENTION

It is an object of the present invention to provide an apparatus of the aforementioned type which avoids the above-mentioned disadvantages of such apparatus.

It is a further object of the present invention to provide for an apparatus of the aforementioned kind, in which even if the two sprocket chains to which the entrainment members are connected will have, after extensive use of the apparatus, different length elongations, the entrainment members will still be maintained in a position substantially normal to the direction of movement thereof.

With these and other objects in view, the apparatus according to the present invention for applying fins onto stationarily held pipes, mainly comprises support means, holding means on the support means for holding at least one pipe in the region of one end thereof in stationary position with the axis of the pipe extending in a predetermined direction, and means for applying fins seriatim to the pipe from the other end thereof. Such applying means may comprise a pair of endless sprocket chains extending with the working runs thereof substantially parallel to said predetermined direction and being transversely spaced from each other, and a plurality of parallel entrainment elements connected spaced from each other in said predetermined direction to the sprocket chains and mounted thereon for movement therewith, each tiltable between a working position moving a fin along the pipe and a releasing position, releasing the advanced fin. The apparatus further includes drive means cooperating with said sprocket chains for synchronously driving the same, and means cooperating with said sprocket chains for equalizing any different elongations of the same so as to keep the plurality of entrainment members parallel to each other.

The equalizing means preferably comprise two freely turnable equalizing sprocket wheels rigidly connected to each other and respectively engaging the sprocket chains. The drive means preferably comprise a pair of rigidly connected driven sprocket wheels respectively engaging the two sprocket chains for driving the same, and the equalizing sprocket wheels are preferably spaced in the aforementioned predetermined direction a considerable distance from the driven sprocket wheels. It is especially advantageous when each of the equalizing sprocket wheels engages the working run of the respective sprocket chain. This will assure that even during great and different elongations of the two sprocket chains, such different elongations will be equalized in the working runs of the chains and in such a manner to positively avoid a deviation of the positions of the entrainment members from the desired position extending normal to the axis of the pipe or pipes. Even if one of the sprocket chains should, after extended use of the apparatus, become longer than the other sprocket chain, the two equalizing sprocket wheels which are freely rotatably mounted but connected to each other for synchronous rotation and which respectively engage the working runs of the two sprocket chains at a relatively great distance from the driven sprocket wheels, will assure that the entrainment elements will be maintained parallel to each other and in the desired position normal to their direction of movement so that the fins will also be applied to the pipes in a position normal to the axes thereof, without being bent and without enlarging any collar attached to the fins.

The two equalizing sprocket wheels are preferably keyed to a common shaft which is freely turnably mounted on the support means. It is also advantageous that the two equalizing sprocket wheels have each only a small number of teeth, for instance six teeth. The pitch of the equalizing sprocket wheels in such a construction corresponds to that of a sprocket chain with relatively great center distances in which the side bars of the chain links have a relatively great length, for instance 90–100 mm.

Each of the sprocket chains may comprise a plurality of freely turnable transport rollers connected to the respective sprocket chain on the side thereof facing away from the other chain and spaced in the direction of the sprocket chain relatively great distances from each other. The teeth of the equalizing sprocket wheels will engage the transport rollers. Such transport rollers may also be used to drive the sprocket chains by the driven sprocket wheels which are arranged a relatively great distance from the equalizing sprocket wheels.

The equalizing sprocket wheels are preferably arranged in the space between the working run and the return run of each chain, which has the advantage that the overall height of the apparatus will not be increased.

The driven sprocket wheels are preferably arranged forwardly of the free ends of the pipes to which the fins are delivered preferably from a die press, so that the driven sprocket wheels may be driven from the same motor which drives the press, whereas the equalizing sprocket wheels are preferably arranged in the region of the opposite reversing portion of the endless sprocket chains.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
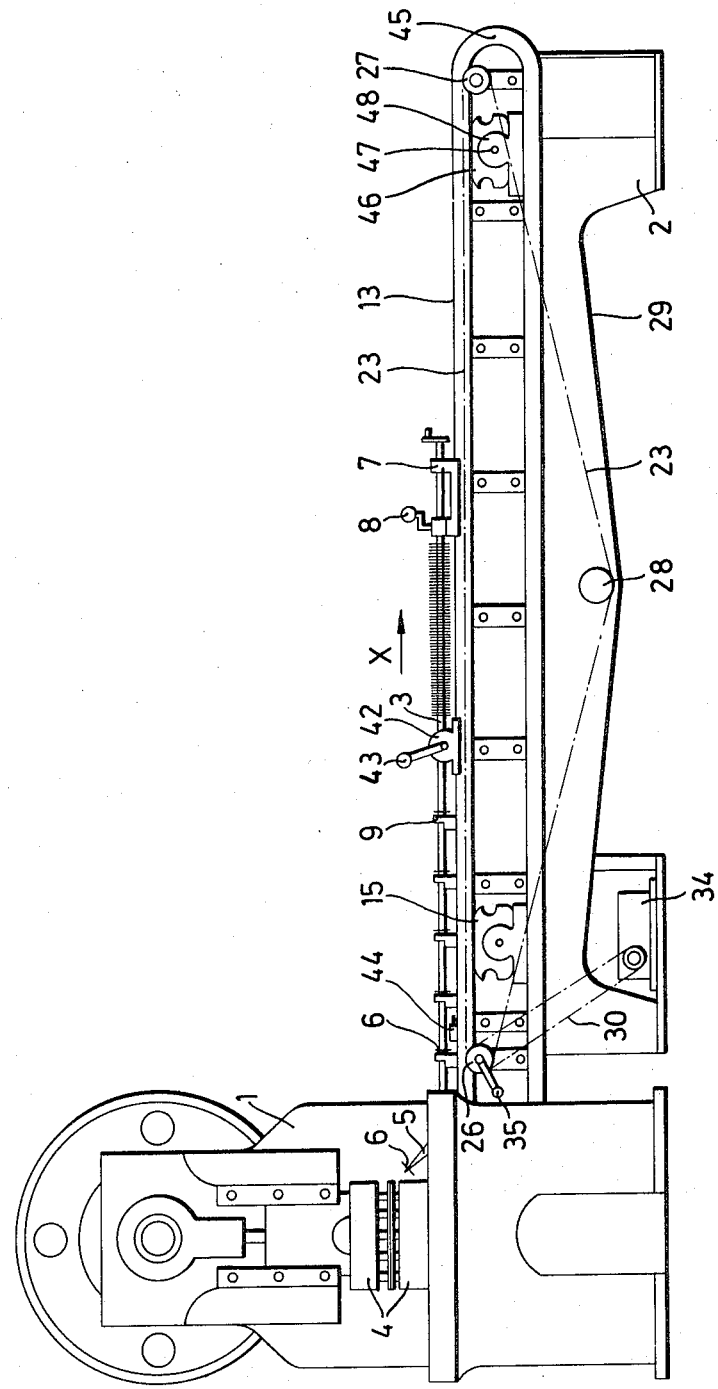
FIG. 1 is a schematic overall side view of the apparatus according to the present invention.

Referring now to the drawing and especially to FIG. 1 of the same, it will be seen that the apparatus according to the present invention comprises support means in form of an elongated frame or bench 2 on which at least one pipe 3 is held on one end, shown in FIG. 1, as the right end, in a stationary position in a manner as will be described later on, whereas the opposite left end of the pipe is free to receive, in a manner as will be described in the following, a plurality of fins one after the other. Arranged adjacent to the left end of the pipe or pipes is a punch press 1 of known construction which produces fins 6 each provided with a central opening and preferably also a collar about the opening of a diameter corresponding to the outer diameter of the pipe so as to assure a slide fit of the fins on the pipe or pipes. The fins produced by the dies 4 on the punch press 1 are fed seriatim by means of a feeding device, not shown in the drawing and not forming part of the present invention, to the pipe or pipes 3 held in stationary position on the bench 2.

The pipe or pipes 3 held in stationary position extending substantially parallel to the upper surface of the bench 2 and in longitudinal direction of the latter by means of a holding device 7 mounted on the upper portion of the bench 2, in a known manner, adjustably in longitudinal direction thereof, so that position of the holding device 7 may be adjusted depending on the length of the pipes used in the apparatus. The holding device 7 comprises a collar surrounding each of the pipes in which the right end of the pipe, as viewed in FIG. 1, may be fixed by means of a clamping element 8. A receiving horn 5 is placed on the free end of each pipe, shown in FIG. 1 as the left end, which horn or horns are arranged in such a manner that the punched fins transported from the feeding device will be received one after the other by the horns to be slipped onto the pipes along which they are then entrained by entrainment members 9.

The entrainment members 9 are connected spaced from each other to a pair of sprocket chains 10, the working runs of which extend parallel to the axes of the pipes 3 and the entrainment members 9 are connected to the sprocket chains 10 tiltably about horizontally arranged tilting shafts 11 (see also FIG. 2 and 3) which respectively extend normal to the movement of the working run of the chains indicated by the arrow X. The side bars of each sprocket chain 10 have a relatively great length and the pitch of the each sprocket chain may for instance be 85 mm. Each of the shafts 11 about which the entrainment members 9 are tiltable preferably carries at opposite outer ends thereof a pair of guide rollers 12 respectively guided in guide rails 13 of U-shaped profile connected to the bench 2. In addition, each of the shafts 11 is provided with a pair of transport rollers 14, respectively arranged inwardly and adjacent to the guide rollers 12 freely rotatable on the shafts 11. The transport rollers 14 are in the region of the left end of the bench, as viewed in FIG. 1, engaged by a pair of driven sprocket wheels 15 which have a large pitch corresponding to the distance of the transport rollers 14 in the direction of the arrow X. The driven sprocket wheels 15 engage thereby only the rollers 14 which are located in the upper working run of the two sprocket chains 10.

The driven sprocket wheels 15 are arranged near the ends of the sprocket chains facing the press 1 adjacent the reversing portions of the chains in which the lower return run passes to the upper working run. This reversing portion is in FIG. 1 hidden by part of the press.

Two equalizing sprocket wheels 46 of equal construction are arranged adjacent the opposite reversing portion 45 at which the upper working run passes over to the lower return run extending parallel thereto. The equalizing sprocket wheels 46 are arranged between the two runs and have each a diameter smaller than the distance between the two runs. The two equalizing sprocket wheels 46 are fixedly keyed to a shaft 47 which is freely turnably mounted in bearings 48. The lateral distance between the two equalizing sprocket wheels 46 is equal to the distance between the two transport rollers 14 on each shaft 11. The two equalizing sprocket wheels have a large pitch and have, for instance, each only six teeth. The teeth engage at the working run of the two chains the transport rollers 14 which are freely turnable on the shafts 11 and assure thereby that these shafts 11 in the working run of the two chains are maintained exactly normal to the of movement X of the chains so that also the entrainment members 9 along the whole length of the pipes are maintained exactly normal to the direction X and therewith exactly normal to the longitudinal axes of the pipes to be provided with the fins.

Figure 2:
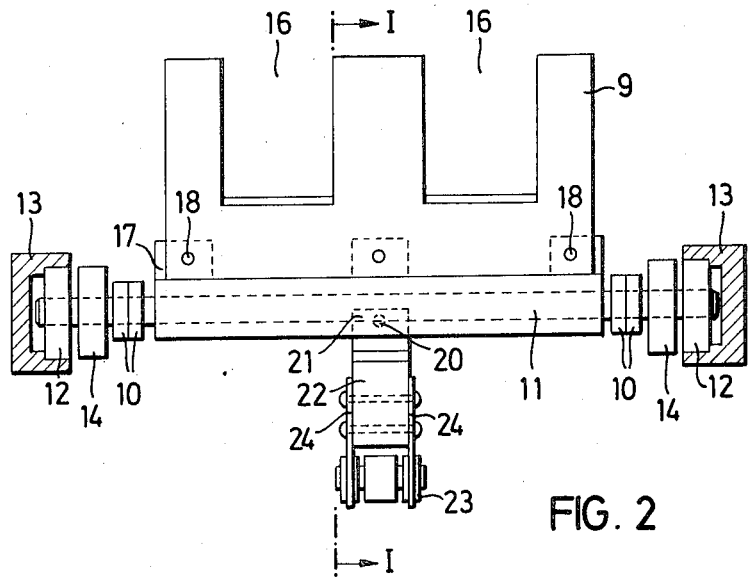
FIG. 2 is an end view of an entrainment element shown in active position, and elements cooperating therewith.
Figure 3:
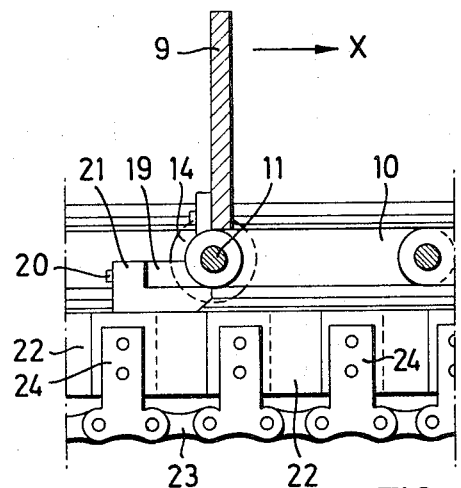
FIG. 3 is a cross section taken along the line I—I of FIG. 2.

In the embodiment as illustrated in FIG. 2 the entrainment members 9 are provided at their upper portions with two cutouts 16 through which two pipes which are to be provided with fins may extend. The cutouts 16 have a width greater than the outer diameter of the pipes 3 but smaller than the outer diameter of the fins 6. Evidently, it is also possible to construct the apparatus and each entrainment member in such a manner that more than two pipes arranged side by side may simultaneously be provided with fins by means of one and the same entrainment member 6. The entrainment members have in this case to be provided with a corresponding greater number of cutouts 16. The pipes 3 may be provided with individual fins of for instance circular configuration or with fins extending over a plurality of side by side arranged pipes and which simultaneously form connection elements for the plurality of pipes.

The entrainment members 9 are connected at opposite corners of their lower edges by screws 18 or similar fastening elements to lugs 17 projecting transversely from opposite ends of a sleeve freely turnably mounted on the shaft 11. An additional lug in the region of the center of the lower edge of each entrainment member 9 is formed as a glide shoe 19. The glide shoe 19 extends substantially in a direction opposite to the advancing direction X of the entrainment member and is provided at the lower side thereof with a glide member 21 connected thereto by screws or the like. Due to this arrangement, the glide shoe 19 will apply to the respective entrainment member 9 a turning moment tending to turn the entrainment member about the axis of the shaft 11 in a direction which is opposite to the advancing direction X of the entrainment member.

The entrainment members 9 are held, during part of their movement in which they apply the fins 6 to the pipes, in a vertical working position due to the sliding of the glide members 21 on a horizontal supporting face which is formed by the upper faces of a row of support members 22. The support members 22 are fastened onto upwardly projecting portions 24 on the links of a support chain 23 and they extend essentially over the length of two links of this chain. The upper working run of the endless support chain 23 has a length which at least equals the length of the pipes to be provided with fins, whereby substantially only half of the total length of the support chain 23 is provided with support members 22. The upper working run of the support chain 23 is moved during applying of the fins 6 to the pipes 3 in the direction opposite to the advancing direction X of the upper run of the sprocket chains 10 and serves as a device which will hold the entrainment members 9 in their working position while permitting tilting of the entrainment members 9 from the substantially vertically extending working position to a releasing position when the fins 6 advanced by the entrainment members 9 have respectively reached the desired end position on the pipes 3.

The support chain 23 is guided, as shown in FIG. 1 over a drive wheel 26, a reversing wheel 27 and a tensioning wheel 28. The drive wheel 26 may be driven over a belt drive 30 or the like from a motor 34, or the drive wheel 26 may also be driven from the same motor which drives the punch press 1 and the sprocket chains 10. As shown in FIG. 1, a crank 35 is fixed to the shaft of the drive wheel 26, by means of which the support chain 23 may be returned to its starting position after a desired number of fins have been applied to the pipes, so as to be ready for the next applying operation.

As soon as the glide shoes 19 of the entrainment members 9 leave the last support member 22 of the row of support members moving in a direction opposite the advancing direction of the entrainment members 9, the turning moment applied to the respective entrainment member by the glide shoe attached thereto together with the resistance of the advanced fin, will assure that the respective entrainment member 9 will be tilted from its vertical active position to a releasing position, not shown in the drawing, in which it will free the advanced fins 6 so that the latter will remain stationary while the entrainment member in its releasing position is advanced with the sprocket chains 10.

The instantaneous movement of the entrainment members 9 from the working to the releasing position can be supported if resilient abutments, not shown in the drawing, are provided on a sliding carriage 42 which is coupled to the support chain 23 by means of a clamping lever 43 in such a manner that the resilient abutments thereon will engage the respective entrainment member 9 above the axis of its shaft 11 at the same time or preferably at a slightly earlier moment at which the glide member 21 of the respective entrainment member 9 leaves the last support member 22. The sliding carriage 42 is only schematically indicated in FIG. 1.

A stop switch 44 is adjustably mounted in the region of the end of the bench 2 which faces the punch press 1, and the stop switch is connected in circuit with the drive motor of the press 1 and actuated by a member fixed to the support chain 23 adjacent the last support member connected thereto or by the sliding carriage 42, to stop the drive motor of the press 1. Since the drive motor of the press 1 preferably also drives the sprocket chains 10 as well as the support chain 23, the whole apparatus is stopped in this manner. If the support chain 23 is driven as shown in FIG. 1 from a separate motor 34, the latter may be stopped by an appropriate switch not shown in the drawing, or through a time delay relay from the switch 44 after the support chain 23 has returned to its starting position.

It will be understood that each of the elements described above, or two or more together, may also find a useful application in other types of apparatus for applying fins to pipes differing from the types described above.

While the invention has been illustrated as described as embodied in a apparatus for applying fins to pipes, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Apparatus for applying fins onto stationarily held pipes, comprising support means; holding means on said support means for holding at least one pipe in the region of one end thereof in stationary position with the axis of said pipe extending in a predetermined direction; and means for applying fins seriatim onto the pipe from the other end thereof, said applying means comprising a pair of endless sprocket chains extending with working runs thereof substantially parallel to said predetermined direction, and being transversely spaced from each other, a plurality of parallel entrainment members connected spaced from each other in said predetermined direction and substantially normal thereto to said sprocket chain for movement therewith and each tiltable between an upright working position moving a fin along the pipe and a releasing position releasing the advanced fin, drive means cooperating with said sprocket chain for synchronously driving the same, and means cooperating with said sprocket chain for equalizing any different elongation of the same so as to keep said plurality of entrainment members parallel to each other and extending normal to the direction in which they are advanced.

2. Apparatus as defined in claim 1, wherein said equalizing means comprise two freely turnable equalizing sprocket wheels rigidly connected to each other and respectively engaging said sprocket chains.

3. Apparatus as defined in claim 2, wherein said drive means comprise a pair of driven sprocket wheels respectively engaging said sprocket chains for driving the same, said equalizing sprocket wheels being spaced in said predetermined direction a considerable distance from said driven sprocket wheels.

4. Apparatus as defined in claim 3, wherein each of said equalizing sprocket wheels engages the working run of the respective sprocket chain.

5. Apparatus as defined in claim 2, wherein said equalizing means comprise a shaft freely turnably mounted on said support means, said two equalizing sprocket wheels being coaxially fixed to said shaft.

6. Apparatus as defined in claim 2, wherein each of said sprocket wheels has six teeth.

7. Apparatus as defined in claim 2, wherein each of said sprocket chains comprises a plurality of freely turnable transport rollers connected to the respective sprocket chain at the side thereof facing away from the other sprocket chain and spaced in the direction of the sprocket chain relatively great distances from each other, the teeth of said equalizing sprocket wheels engaging said transport rollers.

8. Apparatus as defined in claim 2, wherein said endless sprocket chains have each a working run and a spaced return run, said equalizing sprocket wheels being located between said runs and having each a diameter smaller than the distance between said runs.

9. Apparatus as defined in claim 2, wherein said endless sprocket chains have each a working run and a return run, and a pair of reversing portions between said runs, said drive means comprising a pair of driven sprocket wheels arranged in the region of the reversing portions at which said chains pass from said return runs to said working runs and wherein said equalizing sprocket wheels are arranged adjacent the other reversing portions.

* * * * *